US010873210B2

(12) United States Patent
Lowenthal et al.

(10) Patent No.: US 10,873,210 B2
(45) Date of Patent: Dec. 22, 2020

(54) NETWORK-CONTROLLED CHARGING SYSTEM FOR ELECTRIC VEHICLES

(71) Applicant: CHARGEPOINT, INC., Campbell, CA (US)

(72) Inventors: Richard Lowenthal, Cupertino, CA (US); Dave Baxter, Monte Sereno, CA (US); Harjinder Bhade, San Jose, CA (US); Praveen Mandal, Los Altos Hills, CA (US)

(73) Assignee: CHARGEPOINT, INC., Campbell, CA (US)

(*) Notice: Subject to any disclaimer, the term of this patent is extended or adjusted under 35 U.S.C. 154(b) by 0 days.

(21) Appl. No.: 15/894,788

(22) Filed: Feb. 12, 2018

(65) Prior Publication Data

US 2018/0178670 A1 Jun. 28, 2018

Related U.S. Application Data

(60) Continuation of application No. 15/458,906, filed on Mar. 14, 2017, now Pat. No. 9,889,761, which is a
(Continued)

(51) Int. Cl.
*H01M 10/44* (2006.01)
*H01M 10/46* (2006.01)
(Continued)

(52) U.S. Cl.
CPC ..... *H02J 13/00017* (2020.01); *B60L 11/1848* (2013.01); *B60L 53/14* (2019.02);
(Continued)

(58) Field of Classification Search
CPC ...... H02J 7/0011; H02J 7/0004; H02J 7/0021; H02J 7/0026; Y02T 10/7005; Y02T 90/14;
(Continued)

(56) References Cited

U.S. PATENT DOCUMENTS

| 586,193 A | 7/1897 | Marconi |
| 4,532,418 A | 7/1985 | Meese et al. |

(Continued)

FOREIGN PATENT DOCUMENTS

| CN | 1372701 A | 10/2002 |
| CN | 1561498 A | 1/2005 |

(Continued)

OTHER PUBLICATIONS

"SAE: Energy Transfer System for Electric Vehicles—Part 2: Communication Requirements and Network Architecture," Surface Vehicle Standard, SAE J2293-2, Jun. 1997, 180 pages.
(Continued)

*Primary Examiner* — Edward Tso
(74) *Attorney, Agent, or Firm* — Nicholson De Vos Webster & Elliott LLP

(57) ABSTRACT

A server of a network-controlled charging system for electric vehicles receives a request for charge transfer for an electric vehicle at a network-controlled charge transfer, determines whether to enable charge transfer, and responsive to determining to enable charge transfer, transmits a communication to the network-controlled charge transfer that indicates to the network-controlled charge transfer to enable charge transfer.

18 Claims, 6 Drawing Sheets

Related U.S. Application Data continuation of application No. 13/903,570, filed on May 28, 2013, now Pat. No. 9,597,974, which is a continuation of application No. 13/425,222, filed on Mar. 20, 2012, now Pat. No. 8,450,967, which is a division of application No. 13/038,336, filed on Mar. 1, 2011, now Pat. No. 8,138,715, which is a continuation of application No. 12/013,296, filed on Jan. 11, 2008, now Pat. No. 7,956,570.

(60) Provisional application No. 61/019,474, filed on Jan. 7, 2008.

(51) Int. Cl.
| | |
|---|---|
| *H02J 13/00* | (2006.01) |
| *G07C 5/00* | (2006.01) |
| *H02J 7/00* | (2006.01) |
| *G07F 15/00* | (2006.01) |
| *B60L 53/14* | (2019.01) |
| *B60L 53/64* | (2019.01) |
| *B60L 55/00* | (2019.01) |
| *B60L 53/66* | (2019.01) |
| *B60L 53/67* | (2019.01) |
| *B60L 53/68* | (2019.01) |
| *B60L 53/30* | (2019.01) |
| *B60L 11/18* | (2006.01) |
| *G06Q 20/40* | (2012.01) |
| *G07C 5/08* | (2006.01) |
| *H04L 12/28* | (2006.01) |
| *H04L 29/08* | (2006.01) |
| *H04W 84/12* | (2009.01) |
| *H04W 84/18* | (2009.01) |

(52) U.S. Cl.
CPC .......... *B60L 53/305* (2019.02); *B60L 53/64* (2019.02); *B60L 53/665* (2019.02); *B60L 53/67* (2019.02); *B60L 53/68* (2019.02); *B60L 55/00* (2019.02); *G06Q 20/401* (2013.01); *G07C 5/008* (2013.01); *G07F 15/005* (2013.01); *H02J 7/0021* (2013.01); *H02J 7/0027* (2013.01); *H02J 13/0075* (2013.01); *B60L 2240/627* (2013.01); *G07C 5/085* (2013.01); *H02J 7/00034* (2020.01); *H02J 7/00045* (2020.01); *H04L 12/28* (2013.01); *H04L 67/12* (2013.01); *H04W 84/12* (2013.01); *H04W 84/18* (2013.01); *Y02B 70/30* (2013.01); *Y02B 90/20* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y04S 20/221* (2013.01); *Y04S 40/126* (2013.01)

(58) Field of Classification Search
CPC ........ Y02T 90/128; Y02T 10/70; B60L 53/14; B60L 53/305
USPC ....... 320/104, 107, 108, 114, 115, 132, 109; 701/22; 702/93; 903/907
See application file for complete search history.

(56) References Cited

U.S. PATENT DOCUMENTS

| | | |
|---|---|---|
| 5,297,664 A | 3/1994 | Tseng et al. |
| 5,327,066 A | 7/1994 | Smith |
| 5,548,200 A | 8/1996 | Nor et al. |
| 5,563,491 A | 10/1996 | Tseng |
| 5,684,379 A | 11/1997 | Svedoff |
| 5,742,229 A | 4/1998 | Smith |
| 5,812,643 A | 9/1998 | Schelberg, Jr. et al. |
| 5,815,824 A | 9/1998 | Saga et al. |
| 5,951,229 A | 9/1999 | Hammerslag |
| 6,081,205 A | 6/2000 | Williams |
| 6,225,776 B1 | 5/2001 | Chai |
| 6,314,169 B1 | 11/2001 | Schelberg, Jr. et al. |
| 6,380,637 B1 | 4/2002 | Hsu et al. |
| 6,466,658 B2 | 10/2002 | Schelberg et al. |
| 6,487,508 B1 | 11/2002 | Suzuki et al. |
| 6,614,204 B2 | 9/2003 | Pellegrino et al. |
| 6,721,400 B2 | 4/2004 | Schelberg et al. |
| 6,727,809 B1 | 4/2004 | Smith |
| 6,791,473 B2 | 9/2004 | Kibria et al. |
| 6,812,857 B1 | 11/2004 | Kassab et al. |
| 6,927,700 B1 | 8/2005 | Quinn |
| 6,930,410 B2 | 8/2005 | Ikeda et al. |
| 7,254,468 B2 | 8/2007 | Pillar et al. |
| 7,538,690 B1 | 5/2009 | Kaplan et al. |
| 7,566,003 B2 | 7/2009 | Silbernagl et al. |
| 7,660,652 B2 | 2/2010 | Smith et al. |
| 7,693,609 B2 | 4/2010 | Kressner et al. |
| 7,747,739 B2 | 6/2010 | Bridge et al. |
| 7,952,319 B2 | 5/2011 | Lowenthal et al. |
| 7,956,570 B2 | 6/2011 | Lowenthal et al. |
| 8,042,631 B2 | 10/2011 | Grieve et al. |
| 8,063,605 B2 | 11/2011 | Tonegawa et al. |
| 8,103,386 B2 | 1/2012 | Ichikawa et al. |
| 8,138,715 B2 | 3/2012 | Lowenthal et al. |
| 8,450,967 B2 | 5/2013 | Lowenthal et al. |
| 8,866,436 B2 | 10/2014 | Lowenthal et al. |
| 9,597,974 B2 | 3/2017 | Lowenthal et al. |
| 10,150,381 B2 | 12/2018 | Lowenthal et al. |
| 2002/0099574 A1 | 7/2002 | Cahill et al. |
| 2002/0116282 A1 | 8/2002 | Martin et al. |
| 2003/0120442 A1 | 6/2003 | Pellegrino et al. |
| 2004/0030619 A1 | 2/2004 | Stokes et al. |
| 2004/0130292 A1 | 7/2004 | Buchanan et al. |
| 2005/0035741 A1 | 2/2005 | Elder et al. |
| 2005/0127855 A1 | 6/2005 | Wobben |
| 2005/0273218 A1 | 12/2005 | Breed et al. |
| 2006/0224484 A1 | 10/2006 | Nhaissi et al. |
| 2006/0250278 A1 | 11/2006 | Tillotson et al. |
| 2007/0040701 A1 | 2/2007 | Browne et al. |
| 2007/0179692 A1 | 8/2007 | Smith et al. |
| 2007/0282495 A1 | 12/2007 | Kempton et al. |
| 2008/0012782 A1 | 1/2008 | Arnold |
| 2008/0040263 A1 | 2/2008 | Pollack et al. |
| 2008/0040296 A1 | 2/2008 | Bridges et al. |
| 2008/0052145 A1 | 2/2008 | Kaplan et al. |
| 2008/0053716 A1 | 3/2008 | Scheucher et al. |
| 2008/0228613 A1 | 9/2008 | Alexander |
| 2008/0281663 A1 | 11/2008 | Hakim et al. |
| 2008/0312782 A1 | 12/2008 | Berdichevsky et al. |
| 2009/0021213 A1 | 1/2009 | Johnson |
| 2009/0030712 A1 | 1/2009 | Bogolea et al. |
| 2009/0040029 A1 | 2/2009 | Bridges et al. |
| 2009/0079388 A1 | 3/2009 | Reddy |
| 2009/0082957 A1 | 3/2009 | Agassi et al. |
| 2009/0091291 A1 | 4/2009 | Woody et al. |
| 2009/0150073 A1 | 6/2009 | Caraballo |
| 2009/0192927 A1 | 7/2009 | Berg et al. |
| 2009/0229900 A1 | 9/2009 | Hafner et al. |
| 2010/0010698 A1 | 1/2010 | Iwashita et al. |
| 2010/0013434 A1 | 1/2010 | Taylor-Haw et al. |
| 2010/0228405 A1 | 9/2010 | Morgal et al. |
| 2011/0258112 A1* | 10/2011 | Eder .................. G06Q 20/10 705/39 |
| 2012/0229085 A1 | 9/2012 | Lau |
| 2012/0323643 A1 | 12/2012 | Volz |
| 2013/0179061 A1* | 7/2013 | Gadh .................. B60L 11/1842 701/123 |

FOREIGN PATENT DOCUMENTS

| | | |
|---|---|---|
| CN | 1614647 A | 5/2005 |
| EP | 1275936 A2 | 1/2003 |
| JP | H05276681 A | 10/1993 |
| JP | H10271694 A | 10/1998 |
| JP | 2003259552 A | 9/2003 |

(56) References Cited

FOREIGN PATENT DOCUMENTS

| | | |
|---|---|---|
| JP | 2003259696 A | 9/2003 |
| JP | 3755490 B2 | 3/2006 |
| JP | 2006074867 A | 3/2006 |
| JP | 2006094655 A | 4/2006 |
| JP | 2006204081 A | 8/2006 |
| JP | 2007066278 A | 3/2007 |
| WO | 99/19959 A1 | 4/1999 |
| WO | 0104984 A1 | 1/2001 |
| WO | 2006050637 A1 | 5/2006 |
| WO | 2006095352 A2 | 9/2006 |
| WO | 2007141543 A2 | 12/2007 |
| WO | 2009014543 A1 | 1/2009 |

OTHER PUBLICATIONS

Bojrup M., et al., "A Dual Purpose Battery Charger for Electric Vehicles," IEEE, 1998, pp. 565-570.
Brooks A.N., et al., "Vehicle-to-Grid Demonstration Project: Grid Regulation Ancillary Service with a Battery Electric Vehicle," Contract No. 01-313, Dec. 10, 2002, 61 pages.
City of Westminster, "Installation of Two On-Street Recharging Points for Electric Vehicles," Dec. 2006, 31 pages.
Kempton W., et al., "Vehicle-to-grid power implementation: From stabilizing the grid to supporting large-scale renewable energy," Journal of Power Sources, 2005, vol. 144 (1), pp. 280-294.
Letendre S.E., et al., "The V2G Concept: A New Model for Power?," Connecting utility infrastructure and automobiles, Feb. 15, 2002, 9 pages.
Nitta C., "System Control and Communication Requirements of a Vehicle-to-Grid (V2G) Network," 2003, 8 pages.
Posicharge, "PosiNET: Fleet Performance Management for your Fast-Charged Vehicles," 2006, AeroVironment, 1 page.
EDF and the Electric Vehicle: Comprehensive and standardized charging facilities, Whitepaper, 1996, pp. 737-741.
Extended European Search Report for Application No. 09700382.6, dated Mar. 1, 2017, 10 pages.
Final Office Action from U.S. Appl. No. 12/335,274 dated Jan. 31, 2013, 22 pages.
Final Office Action from U.S. Appl. No. 12/335,274, dated May 30, 2017, 22 pages.
Final Office Action from U.S. Appl. No. 13/418,296 dated Aug. 6, 2014, 16 pages.
Final Office Action from U.S. Appl. No. 13/418,296 dated Dec. 17, 2013, 15 pages.
Final Office Action from U.S. Appl. No. 15/250,761, dated Aug. 23, 2017, 28 pages.
Final Office Action from U.S. Appl. No. 15/478,109, dated Nov. 24, 2017, 8 pages.
First Examination Report for Australian Patent Application No. 2009204279 dated Dec. 3, 2012, 4 pages.
First Examination Report for New Zealand Patent Application No. 586671 dated Jan. 12, 2012, 2 pages.
First Examination Report for New Zealand Patent Application No. 613104, dated Jul. 17, 2013, 2 pages.
First Examination Report for New Zealand Patent Application No. 703929 dated Feb. 2, 2015, 2 pages.
First Examination Report from foreign counterpart New Zealand Patent Application No. 722774, dated Aug. 4, 2016, 2 pages.
Frirst Office Action for Application No. JP2010542318 dated Jun. 19, 2013, 4 pages.
First Office Action for Chinese Patent Application No. 2009/80104785.4 dated Sep. 15, 2011, 11 pages.
First Office Action from foreign counterpart China Application No. 201510108545.9, dated Nov. 22, 2016, 16 pages.
International Search Report and Written opinion for Application No. PCT/US09/30276 dated Feb. 5, 2009, 12 pages.
Non-Final Office Action from U.S. Appl. No. 12/335,274 dated Jan. 9, 2015, 25 pages.
Non-Final Office Action from U.S. Appl. No. 13/149,860 dated Apr. 23, 2013, 13 pages.
Non-Final Office Action from U.S. Appl. No. 13/418,296 dated Apr. 29, 2014, 12 pages.
Non-Final Office Action from U.S. Appl. No. 13/418,296 dated Jun. 27, 2013, 22 pages.
Non-Final Office Action from U.S. Appl. No. 13/874,413 dated Sep. 10, 2014, 6 pages.
Non-Final Office Action from U.S. Appl. No. 13/903,570 dated Sep. 26, 2014, 10 pages.
Non-Final Office Action from U.S. Appl. No. 14/520,058 dated Jul. 31, 2015, 5 pages.
Non-Final office action from U.S. Appl. No. 15/250,761, dated May 4, 2017, 5 pages.
Non-Final Office Action from U.S. Appl. No. 15/458,906, dated May 18, 2017, 21 pages.
Non-Final Office Action from U.S. Appl. No. 15/478,109, dated Jun. 29, 2017, 6 pages.
Notice of Allowance from U.S. Appl. No. 13/418,300 dated Nov. 28, 2012, 10 pages.
Notice of Allowance from U.S. Appl. No. 13/874,413 dated Jun. 22, 2015, 8 pages.
Notice of Allowance from U.S. Appl. No. 13/903,570 dated Feb. 18, 2015, 7 pages.
Notice of Allowance from U.S. Appl. No. 13/903,570 dated Jul. 15, 2016, 10 pages.
Notice of Allowance from U.S. Appl. No. 13/903,570 dated Jun. 2, 2015, 8 pages.
Notice of Allowance from U.S. Appl. No. 13/903,570 dated Mar. 15, 2016, 7 pages.
Notice of Allowance from U.S. Appl. No. 13/903,570 dated Nov. 4, 2016, 7 pages.
Notice of Allowance from U.S. Appl. No. 13/903,570 dated Sep. 23, 2015, 8 pages.
Notice of Allowance from U.S. Appl. No. 15/250,761, dated Dec. 18, 2017, 10 pages.
Notice of Allowance from U.S. Appl. No. 15/458,906, dated Oct. 4, 2017, 10 pages.
Notification of Reason for Rejection from foreign counterpart Japanese Patent Application No. 2015-139903, dated Jun. 19, 2017, 8 pages.
Notification of Reexamination for Chinese Patent Application No. 2009/80104785.4 dated Jun. 27, 2014, 36 pages.
Oregon Department of Transportation Final Report on Oregon's Mileage Fee Concept and Road User Fee Pilot Program, Nov. 2007; Oregon Department of Transportation, available at http://www.oregon.gov/ODOT/HWY/OIPP/ruftf.shtml, 101 pages.
Patent Examination Report No. 1 from foreign counterpart Australian Patent Application No. 2014218477, dated Sep. 10, 2015, 4 pages.
Patent Examination Report No. 2 from foreign counterpart Australian Patent Application No. 2014218477, dated Aug. 10, 2016, 2 pages.
Second Office Action and Search Report from foreign counterpart Chinese Patent Application No. 201510108545.9, dated Sep. 30, 2017, 24 pages.
Second Office Action for Chinese Patent Application No. 2009/80104785.4 dated Aug. 17, 2012, 14 pages.
Second Office Action for JP 2010-542318 dated Jul. 16, 2014, 3 pages.
The Installation on Public Area of Recharging Terminals for Electric Vehicles, International Electric Vehicle Symposium, Anaheim, Dec. 5-7, 1994, San Francisco, Whitepaper, 1994, pp. 126-135.
Third Office Action for Japanese application No. JP2010542318 dated Mar. 6, 2015, 11 pages.
Vehicle-to-Grid (V2G) Technology, downloaded Jan. 10, 2008, http://www.acpropulsion.com/technology/v2g.htm, 4 pages.
Notice of Allowance from U.S. Appl. No. 15/250,761, dated Jul. 31, 2018, 11 pages.
Notice of Allowance from U.S. Appl. No. 15/478,109, dated Aug. 16, 2018, 17 pages.

(56) References Cited

OTHER PUBLICATIONS

Alan Whitehurst, Correspondence re Hearing on motion for Emergency Injuctive Relief, Document 24, *ChargePoint, Inc.* v. *SemaConnect, Inc.*, Case 8:17-cv-03717-MJG, Dec. 21, 2017, 7 pages.
Brief for Defendant-Appelle SemaConnect, Inc., Document 31, *ChargePoint, Inc.*, v. *SemaConnect, Inc.*, Case No. 18-1739, United States Court of Appeals for the Federal Circuit, May 29, 2018, 76 pages.
Complaint, Document 1, *ChargePoint, Inc.*, v. *SemaConnect, Inc.*, Case: 8:17-cv-03717-MJG, United States District Court for the District of Maryland (Southern Division), Dec. 15, 2017, 30 pages.
Corrected Brief for Plaintiff-Appellant ChargePoint, Inc., Document 26, *ChargePoint, Inc.*, v. *SemaConnect, Inc.*, Case No. 18-1739, United States Court of Appeals for the Federal Circuit, Apr. 19, 2018, 211 pages.
Corrected Plaintiff's Memorandum in Support of Motion for Emergency Injunctive Relief, Document 7-1, *ChargePoint, Inc.*, v. *SemaConnect, Inc.*, Case 8:17-cv-03717-MJG, United States District Court for the District of Maryland (Southern Division), Dec. 15, 2017, 33 pages.
Declaration for David Baxter, Document 7-3, *ChargePoint, Inc.*, v. *SemaConnect, Inc.*, Case 8:17-cv-03717-MJG, United States District Court for the District of Maryland (Southern Division), Dec. 17, 2017, 25 pages.
Declaration of Dr. Zygmunt Haas, Document 43-2, *ChargePoint, Inc.*, v. *SemaConnect, Inc.*, Case 8:17-cv-03717-MJG United States District Court for the District of Maryland (Southern Division), Jan. 15, 2018, 67 pages.
Defendant Semaconnect's Identification of Non-Infringement Defenses, Document 42, *ChargePoint, Inc.*, v. *SemaConnect, Inc.*, Case 8:17-cv-03717-MJG, United States District Court for the District of Maryland (Northern Division), Jan. 8, 2018, 12 pages.
Defendant Semaconnect's Memorandum in Support of Its Motion to Dismiss for Failure to State a Claim, Document 41-1, *ChargePoint, Inc.*, v. *SemaConnect, Inc.*, Case 8:17-cv-03717-MJG, United States District Court for the District of Maryland (Northern Division), Jan. 8, 2018, 43 pages.
Defendant Semaconnect's Reply in Support of Its Motion to Dismiss for Failure to State a Claim, Document 47, *ChargePoint, Inc.*, v. *SemaConnect, Inc.*, Case 8:17-cv-03717-MJG, United States District Court for the District of Maryland (Northern Division), Jan. 19, 2018, 28 pages.
Defendant Semaconnect's Response to Chargepoint's Notice of Supplemental Authority, Document 50, *ChargePoint, Inc.*, v. *SemaConnect, Inc.*, Case 8:17-cv-03717-MJG, United States District Court for the District of Maryland (Northern Division), Feb. 9, 2018, 4 pages.
Exhibit 9, PosiNET: Fleet Performance Management for your Fast-Charged Vehicles, Document 41-11, Case 8:17-cv-03717-MJG, Jan. 8, 2018, 2 pages.
Judgment Order, Document 52, *ChargePoint, Inc.*, v. *SemaConnect, Inc.*, Case 8:17-cv-03717-MJG, United States District Court for the District of Maryland, Mar. 23, 2018, 2 pages.
Memorandum and Order: Motion to Dismiss, Document 51, *ChargePoint, Inc.*, v. *SemaConnect, Inc.*, Case 8:17-cv-03717-MJG, United States District Court for the District of Maryland, Mar. 23, 2018, 70 pages.
Non-Final Office Action from U.S. Appl. No. 12/335,274, dated Mar. 22, 2018, 28 pages.
Notice of Allowance from U.S. Appl. No. 15/250,761, dated Jun. 4, 2018, 10 pages.
Notice of Allowance from U.S. Appl. No. 15/478,109, dated Mar. 27, 2018, 25 pages.
Notice of Supplemental Authority, Document 49, *ChargePoint, Inc.*, v. *SemaConnect, Inc.*, Case 8:17-cv-03717-MJG , United States District Court for the District of Maryland (Northern Division), Feb. 9, 2018, 3 pages.
Order Correcting Memorandum and Order: Motion to Dismiss, Document 56, *ChargePoint, Inc.*, v. *SemaConnect, Inc.*, Case 8:17-cv-03717-MJG, United States District Court for the District of Maryland, Mar. 29, 2018, 2 pages.
Plaintiff's Memorandum in Opposition to Defendant's Motion to Dismiss, Document 43, *ChargePoint, Inc.*, v. *SemaConnect, Inc.*, Case 8:17-cv-03717-MJG, Jan. 15, 2018, 40 pages.
Reply Brief for Plaintiff-Appellant ChargePoint, Document 35, *ChargePoint, Inc.*, v. *SemaConnect, Inc.*, Case No. 18-1739, United States Court of Appeals for the Federal Circuit, Jun. 12, 2018, 42 pages.
Supplemental Declaration of David Baxter, Document 43-1, *ChargePoint, Inc.*, v. *SemaConnect, Inc.*, Case 8:17-cv-03717-MJG, United States District Court for the District of Maryland (Southern Division), Jan. 15, 2018, 42 pages.
Communication Pursuant to Article 94(3) EPC Application No. 09700382.6, dated Nov. 5, 2018, 10 pages.
Final Office Action from U.S. Appl. No. 12/335,274, dated Sep. 19, 2018, 27 pages.
Notice of Allowance from U.S. Appl. No. 15/478,109, dated Nov. 28, 2018, 10 pages.
Notice of Allowance from U.S. Appl. No. 15/250,761, dated Nov. 9, 2018, 6 pages.
Further Examination Report, New Zealand Application No. 722774, dated Feb. 27, 2018, 2 pages.
First Examination Report, New Zealand Application No. 739517, dated Feb. 28, 2018, 2 pages.
Third Chinese Office Action, Application No. 2015101085459, dated Mar. 27, 2018, 18 pages.
Fourth Chinese Office Action, Application No. 201510108545.9, dated Dec. 5, 2018, 8 pages.
Notice of Allowance from U.S. Appl. No. 15/478,109, dated Mar. 19, 2019, 12 pages.
Notice of Allowance from U.S. Appl. No. 12/335,274, dated Apr. 3, 2019, 12 pages.
Reason for rejection from foreign counterpart Japanese Patent Application No. 2018029353, dated Jan. 21, 2019, 6 pages.
United States Court of Appeals for the Federal Circuit, *ChargePoint, Inc.*, v. *Semaconnect, Inc.*, No. 2018-1739, Mar. 28, 2019, 28 pages.
Abandonment for U.S. Appl. No. 13/418,296, dated Feb. 26, 2015, 2 pages.
Abandonment for U.S. Appl. No. 13/874,413, dated Aug. 26, 2016, 1 pages.
AeroVironment, Inc., "PosiNET: Fleet Performance Management for your Fast-Charged Vehicles", 1 page (2006).
Final Office Action from U.S. Appl. No. 12/335,274, dated Oct. 23, 2015, 25 pages.
Final Office Action from U.S. Appl. No. 13/149,860, dated Nov. 15, 2013, 6 pages.
Final Office Action from U.S. Appl. No. 14/520,058, dated Dec. 24, 2015, 17 pages.
International Preliminary Report on Patentability and Written Opinion of the International Searching Authority from counterpart PCT Application No. PCT/US2009/030276, dated Jul. 13, 2010, 10 pages.
Non-Final Office Action from U.S. Appl. No. 12/335,274, dated Jun. 24, 2011, 20 pages.
Non-Final Office Action from U.S. Appl. No. 12/335,274, dated May 7, 2012, 20 pages.
Non-Final Office Action from U.S. Appl. No. 13/038,336, dated Jul. 11, 2012, 20 pages.
Non-Final Office Action from U.S. Appl. No. 13/425,222, dated Aug. 23, 2012, 10 pages.
Non-Final Office Action received for U.S. Appl. No. 12/335,274, dated Oct. 7, 2019, 29 pages.
Non-Final Office Action, U.S. Appl. No. 16/215,407, dated Nov. 29, 2019, 8 pages.
Notice of Allowance from U.S. Appl. No. 12/013,296, dated Jan. 21, 2011, 10 pages.
Notice of Allowance from U.S. Appl. No. 12/505,394, dated Apr. 14, 2011, 9 pages.
Notice of Allowance from U.S. Appl. No. 12/505,394, dated Dec. 28, 2010, 7 pages.
Notice of Allowance from U.S. Appl. No. 13/038,336, dated Nov. 14, 2011, 6 pages.

(56) References Cited

OTHER PUBLICATIONS

Notice of Allowance from U.S. Appl. No. 13/149,860, dated Jun. 12, 2014, 7 pages.
Notice of Allowance from U.S. Appl. No. 13/149,860, dated Mar. 6, 2014, 7 pages.
Notice of Allowance from U.S. Appl. No. 13/418,300, dated Mar. 15, 2013, 11 pages.
Notice of Allowance from U.S. Appl. No. 13/418,300, dated Sep. 19, 2012, 15 pages.
Notice of Allowance from U.S. Appl. No. 13/425,222, dated Jan. 28, 2013, 11 pages.
Notice of Allowance from U.S. Appl. No. 13/874,413, dated Jan. 29, 2016, 11 pages.
Notice of Allowance from U.S. Appl. No. 13/874,413, dated Mar. 2, 2015, 11 pages.
Notice of Allowance from U.S. Appl. No. 13/874,413, dated May 23, 2016, 10 pages.
Notice of Allowance from U.S. Appl. No. 13/874,413, dated Oct. 1, 2015, 8 pages.
Notice of Allowance from U.S. Appl. No. 14/520,058, dated Apr. 22, 2016, 10 pages.
Notice of Allowance, U.S. Appl. No. 15/478,109, dated Dec. 12, 2019, 8 pages.
Requirement for Restriction/Election for U.S. Appl. No. 13/038,336, dated May 24, 2011, 8 pages.
Supreme Court of the United States, *ChargePoint, Inc. v. SemaConnect, Inc.*, No. 19-521, Petition for a Writ of Sertiorari (Oct. 21, 2019), 39 pgs.
Supreme Court of the United States, *ChargePoint, Inc. v. SemaConnect, Inc.*, No. 19-521, Denial of Petition for a Write of Certiorari, 589 U.S. (U.S. Jan. 27, 2020), 12 pgs.
Notice of Allowance, U.S. Appl. No. 15/478,109, dated Apr. 2, 2020, 6 pages.
Final Office Action, U.S. Appl. No. 16/215,407, dated Apr. 15, 2020, 7 pages.
communication pursuant to Article 94(3) EPC, EP App. No. 09700382.6, dated Apr. 9, 2020, 4 pages.

\* cited by examiner

NETWORK-CONTROLLED CHARGING SYSTEM FOR ELECTRIC VEHICLES

CROSS REFERENCE TO RELATED APPLICATIONS

This application is a continuation of U.S. application Ser. No. 15/458,906, filed Mar. 14, 2017, which is a continuation of U.S. application Ser. No. 13/903,570, filed May 28, 2013, now U.S. Pat. No. 9,597,974, which is a continuation of U.S. application Ser. No. 13/425,222, filed Mar. 20, 2012, now U.S. Pat. No. 8,450,967, which is a divisional of U.S. application Ser. No. 13/038,336, filed Mar. 1, 2011, now U.S. Pat. No. 8,138,715, which is a continuation of U.S. application Ser. No. 12/013,296, filed Jan. 11, 2008, now U.S. Pat. No. 7,956,570, which claims the benefit of U.S. Provisional Application No. 61/019,474 filed Jan. 7, 2008, all of which are incorporated by reference herein.

BACKGROUND OF THE INVENTION

Field of the Invention

This invention relates to the field of systems and methods for recharging electric vehicles and to network-controlled electrical outlets used in such systems.

Description of the Related Art

The electric car, electric vehicle (EV) and battery electric vehicle are all used to describe automobiles powered by one or more electric motors utilizing energy stored in rechargeable batteries. The batteries are recharged by connecting to an electrical outlet. Efficient recharging of the batteries typically requires hours and is often done overnight or while the electric vehicle is parked for a significant time. The use of electric vehicles is limited by the sparse availability of recharging facilities. There is a need for more widespread recharging facilities. Furthermore, there is a need for more recharging facilities available where vehicles are parked for longer periods of time.

An important part of any consumer experience is the ease of acquiring a product—to recharge an electric vehicle this entails finding an available recharging facility, controlling the facility, and paying for the electricity consumed. There is a need for a communication network which facilitates finding the recharging facility, controlling the facility, and paying for the electricity consumed.

Electricity grids have periods of high demand from customers where the demand may approach or even exceed the electricity supply. Conversely, there are periods of low demand which coincide with high electricity production. Demand Response is a mechanism for reducing consumption of electricity during periods of high demand For example, consumer services such as air conditioning and lighting may be reduced during periods of high demand according to a preplanned load prioritization scheme. Demand Response may also be used to increase demand at times of high electricity production. For example, the cost of electricity may be reduced during periods of low demand. Furthermore, some Demand Response systems encourage energy storage during periods of low demand, for release back into the electricity grid during periods of high demand. For example, battery electric vehicles may be charged during periods of low power demand and then release power back to the grid during periods of high demand Electric vehicles can be recharged from a local electricity grid. These vehicles can also be a source of electric power to be transferred to the local electricity grid. The transfer of electricity stored in electric vehicles to the local electric grid is referred to as vehicle-to-grid (V2G). V2G is particularly attractive for electric vehicles which have their own charging devices, such as battery electric vehicles with regenerative braking and plug-in hybrid vehicles. V2G is desirable for peak load leveling—helping to meet the demand for electricity when demand is at its highest. V2G is not widely available—it is principally being used in small pilot schemes. There is a need for more widely available Demand Response and V2G to assist with peak load leveling.

For Demand Response and V2G to be implemented effectively, real time communication of a need for power input into the local electricity grid is required. This communication from electric utility companies needs to reach recharging facility managers and electric vehicle owners and users. There is a need for an efficient communication network for managing peak load leveling using Demand Response and V2G.

Currently, a major source of revenue for building and maintaining highways for vehicular traffic is the gasoline tax. Should electric vehicles start to replace significant numbers of gasoline burning vehicles there will be a drop in tax revenues. To compensate for this loss in revenue, a tax on electricity consumption by electric vehicles may be imposed. Such a tax would require accurate measurement and reporting of electricity consumed by electric vehicles. Consequently, there will be a need for a system for collection of taxes and consumption information.

As is clear from the above discussion, communication networks are an essential part of electric vehicle recharging systems that will meet the needs of electric vehicle operators, recharging facility operators, utility companies and tax authorities. A survey of communication networks, ranging from local area networks to wide area networks, is provided below. There is a focus on wireless networks which would be accessible to mobile communication devices. A variety of mobile communication devices are also described.

A radio frequency identification transmitter, commonly referred to as an RFID transmitter, is used for short range communication with an RFID receiver. Typical ranges are of the order of one meter to tens of meters. An example of an RFID transmitter is a remote keyless entry device.

A radio frequency identification transceiver, commonly referred to as an RFID transceiver, is used for short range communication with an RFID transponder. (A transceiver is a device that has both a transmitter and a receiver.) Typical ranges are of the order of one meter for communication with passive transponders and hundreds of meters for communication with active transponders. The longer range of the active transponders is due to a power supply integrated into the transponder. RFID transponders store information which is broadcast over radio frequencies when prompted by a specific radio frequency signal from an RFID transceiver. An example of an RFID transponder is a FasTrak® card, primarily used for payment of automotive tolls in California. Each FasTrak® card has a unique code which is associated with a debit account. Each time a FasTrak® card passes through a toll collection point, the unique code is transmitted by the card in response to being interrogated by an RFID transceiver. The code is detected by the RFID transceiver and the toll is debited from the user's account.

A wireless personal area network (WPAN) radio frequency transceiver is used for radio frequency short range (typically within 1-100 meters) communication between devices. An example of such a device is a Bluetooth® transceiver, where Bluetooth® refers to a particular standard and protocol primarily designed for short range radio frequency communications. Another example is a ZigBee® transceiver, where ZigBee® refers to a standard and protocol designed for short range radio frequency communications. ZigBee® transceivers form mesh networks.

A wireless local area network transceiver is used for radio frequency communication over tens of meters or more between devices. An example of such a device is a Wi-Fi® device, where a Wi-Fi® device is one that is based on the IEEE 802.11 standard. Another example is a ZigBee® device—see discussion above. Wireless local area networks (WLANs) are typically configured to provide higher throughput and cover greater distances than wireless personal area networks (WPANs); a WLAN typically requires more expensive hardware to set up than a WPAN.

Power line communication (PLC) technology can be used to network computers over electrical power lines. This technology is restricted to short distances for high-speed transmission of large amounts of data. An alternating current line transceiver is used to enable PLC. A PLC network is another example of a LAN.

Wired local area networks (wired LANs), which include both wire and optical fiber, are also used to connect computers. A wired LAN is distinguished from a PLC LAN by the use of dedicated wires, used only for carrying communication signals and not used as a power lines. The Ethernet is the most widespread wired LAN technology.

Wide area networks (WANs) are computer networks that cover a broad geographical area—a network that crosses city, regional or national boundaries. The best known example of a WAN is the Internet. The Internet is a worldwide, publicly accessible plurality of interconnected computer networks that use a standard protocol—Transmission Control Protocol (TCP)/Internet Protocol (IP). Many local area networks are part of the Internet. There are also privately owned WANs. The World Wide Web (WWW), often referred to as the Web, is a collection of interconnected web pages. The Web is accessible via the Internet.

There is a need to effectively integrate these wide area networks, local area networks and short range communication devices into systems used for recharging electric vehicles.

SUMMARY OF THE INVENTION

A system for network-controlled charging of electric vehicles and the network-controlled electrical outlets used in this system are described herein. The system comprises electrical outlets, called Smartlets™, networked as follows: Smartlets™ and electric vehicle operators communicate via wireless communication links; Smartlets™ are connected by a LAN to a data control unit; and the data control unit is connected to a server via a WAN. The server stores: consumer profiles (including account information for payment); utility company power grid load data (updated in real time by the utility company); and electricity consumption data that may be required for government tax purposes. The system may be vehicle-to-grid enabled.

Vehicle operators may use a variety of mobile communication devices to communicate with the Smartlets™, including: one-way RFID, two-way RFID, WPAN and WLAN devices. Communication between the Smartlets™ and the data control unit may be either via a PLC LAN or a WLAN. The WAN may be a private WAN, or the Internet.

Some systems also include a payment station, remote from the Smartlets™, which can be set up to allow vehicle operators to pay for both parking and recharging of their vehicles. When payment stations are included in the system, the data control units may conveniently be incorporated into the payment stations. Some system may be enhanced with a device for detecting the presence of a vehicle occupying the parking space in front of the Smartlet™. Such devices may include sonar, TV camera and induction coil devices. Furthermore, parking meter display units may be attached to the Smartlets™ to provide parking information, including: (1) paid parking time remaining; and (2) parking violation.

A Smartlet™ comprises an electrical receptacle configured to receive an electrical connector for recharging an electric vehicle; an electric power line connecting the receptacle to a local power grid; a control device on the electric power line, for switching the receptacle on and off; a current measuring device on the electric power line, for measuring current flowing through the receptacle; a controller configured to operate the control device and to monitor the output from the current measuring device; a local area network transceiver connected to the controller, the local area network transceiver being configured to connect the controller to the data control unit; and a communication device connected to the controller, the communication device being configured to connect the controller to a mobile wireless communication device, for communication between the operator of the electric vehicle and the controller.

A method of transferring charge between a local power grid and an electric vehicle is disclosed herein. The method comprises the following steps: (1) assembling a user profile, the user profile containing payment information, the user profile being stored on a server; (2) providing an electrical receptacle for transferring charge, the receptacle being connected to the local power grid by an electric power line, charge transfer along the electric power line being controlled by a controller configured to operate a control device on the electric power line; (3) receiving a request to the controller for charge transfer, the request being made from a mobile wireless communication device by an operator of the electric vehicle, the controller being connected to a communication device for communication with the mobile wireless communication device; (4) relaying the request from the controller to the server, the controller being connected to a local area network for communication to the server via a wide area network; (5) validating a payment source for the operator of the electric vehicle based on the user profile corresponding to the operator; (6) enabling charge transfer by communicating from the server to the controller to activate the control device; (7) monitoring the charge transfer using a current measuring device on the electric power line, the controller being configured to monitor the output from the current measuring device and to maintain a running total of charge transferred; (8) detecting completion of the charge transfer; and (9) on detecting completion, sending an invoice to the payment source and disabling charge transfer.

The method of transferring charge between a local power grid and an electric vehicle may also include the step of determining charge transfer parameters. This determination may be based on power grid load data, provided by the utility company and available on the server. For example, the utility company's Demand Response system may limit recharging of electric vehicles during periods of high electricity demand. This determination may also be made based on the user profile provided by the vehicle operator and available on the server. The user profile may include information such as whether the vehicle operator wants to: charge the electric vehicle only during periods of lower power rates; not charge the vehicle during periods of high power grid load; and sell power to the local grid.

Furthermore, the method of transferring charge between a local power grid and an electric vehicle may also include the steps of: determining availability of parking spaces with Smartlets™; communicating availability to the server where the information is accessible by vehicle operators on the Web. A vehicle detector, as described above, may be used to determine whether a parking space is available.

When a payment station is available to a vehicle operator, a request to the Smartlet™. controller for vehicle charging may be made from the payment station instead of by a mobile communication device. Furthermore, the payment station may be used to pay for parking, independent of electric vehicle recharging.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Figure 1:
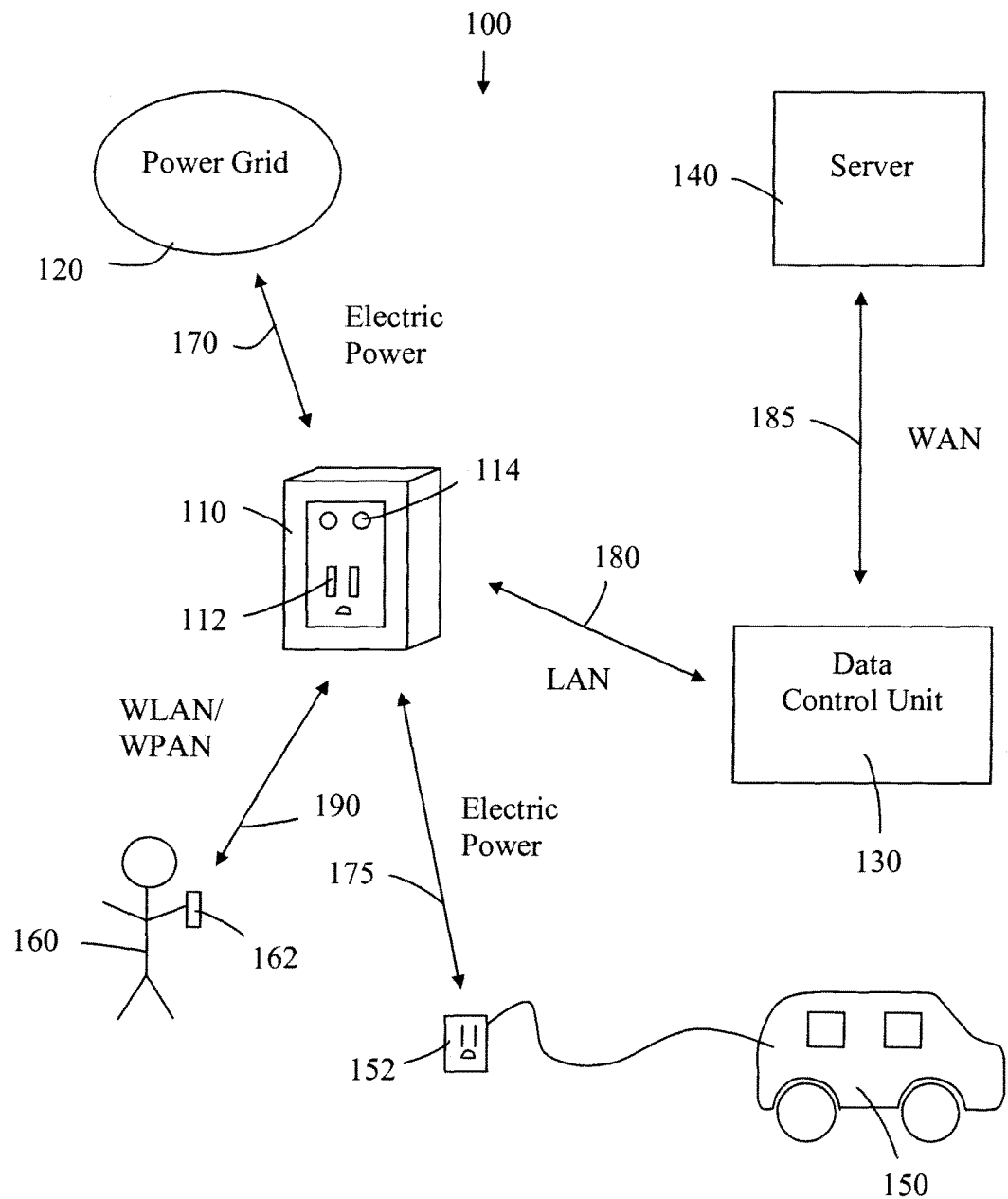
FIG. 1 is a schematic diagram of a network-connected charging outlet system according to a first embodiment of the invention.

A first embodiment of the network-controlled charge transfer system 100 for charging electric vehicles is shown in FIG. 1. The system 100 comprises a network-controlled charge transfer device 110, a local power grid 120, a data control unit 130, and a server 140. The system 100 interfaces with an electric vehicle 150, with an electrical connector 152, and an electric vehicle operator 160, via a mobile communication device 162. The network-controlled charge transfer device 110, referred to herein as a Smartlet™, is connected to the local power grid 120 by an electric power line 170, and to the electric vehicle 150 by the electrical connector 152. The flow of electrical power may be in either direction for both of these electrical connections. In other words, the electric vehicle 150 can be recharged from the local power grid 120, or the local power grid 120 can receive power from the electric vehicle 150. The Smartlet™ 110 has a communication link to the data control unit 130 over a local area network (LAN) 180. The LAN 180 may be either a wireless local area network (WLAN) or a power line communication (PLC) network. The data control unit 130 has a communication link to the server 140 over a wide area network (WAN) 185. The electric vehicle operator 160 uses the mobile communication device 162 to establish a communication link to the Smartlet™ 110 over a wireless network 190. This wireless network may be a WLAN or a wireless personal area network (WPAN). The communication link between the electric vehicle operator 160 and the Smartlet™ 110 allows information to be shared which enables recharging of the electric vehicle 150.

The Smartlet™ 110 comprises an electrical receptacle 112 and indicator lights 114. The electrical receptor 112 and the electrical connector 152 are configured to make an electrical connection allowing safe flow of electrical power between the Smartlet™ 110 and the electrical vehicle 150. Examples of suitable receptacles are those conforming to the NEMA (National Electrical Manufacturers Association) standards 5-15, 5-20 and 14-50. Although, other receptacles will be used for systems outside the United States which operate at voltages other than 110V (for example 220V) and which are required to meet different standards. In preferred embodiments the electrical receptacle 112 has a cover. The cover is lockable and is released by the Smartlet™ 110 upon receipt of a request for charging of an electrical vehicle 150 by the electric vehicle operator 160. This request may be made by the mobile communication device 162, as described above.

The indicator lights 114 are used to show the operational status of the Smartlet™ 110—for example, the status may be: charging in progress, charging complete, vehicle-to-grid (V2G) in progress and error warning. The indicator lights 114 may be LEDs (light emitting diodes), may be capable of showing a number of different colors and may be capable of continuous or flashing modes of operation. Alternatively, the indicator lights 114 may be replaced by an alphanumeric display.

The local power grid 120 is the electrical supply grid owned and operated by local utility companies. Although, the local power grid 120 does extend to parts of the electrical supply network that are not owned by the utility company, such as electrical cables on private premises.

The data control unit 130 acts as a bridge between the LAN and the WAN, and enables communication between the Smartlet™ 110 and the server 140. The server 140 is generally remote from the Smartlet™ 110.

The system 100 is shown in FIG. 1 with only one Smartlet™ 110; however, the system will be comprised of many Smartlet™ 110, all linked to the server 140 through one or more data control units 130. There will be one data control unit 130 for each group of geographically proximate (within the range of the same local area network) Smartlets™ 110.

The electric vehicle 150 is any battery operated electric vehicle, including EVs and plug in hybrids. Electric vehicles 150 that have the necessary V2G electronics are able to provide power to the local power grid 120.

The mobile communication device 162, used by the electric vehicle operator 160, can be any type of WLAN or WPAN compatible device. Examples of compatible devices are: one way and two-way RFID devices, an example of the latter being a FasTrac.RTM. card; Wi-Fi® devices, such as a personal computer; BlueTooth® devices, such as a mobile phone; and ZigBee® devices. In some embodiments of the invention the vehicle user 160 can monitor charging using the mobile communication device 162. This can be implemented by allowing access to the vehicle user 160 of the power consumed by the electric vehicle 150, which is monitored by the Smartlet™ 110 and stored on the server 140. Access can either be directly to the Smartlet™ 110 over a LAN or to the server 140 over the Internet.

Figure 2:
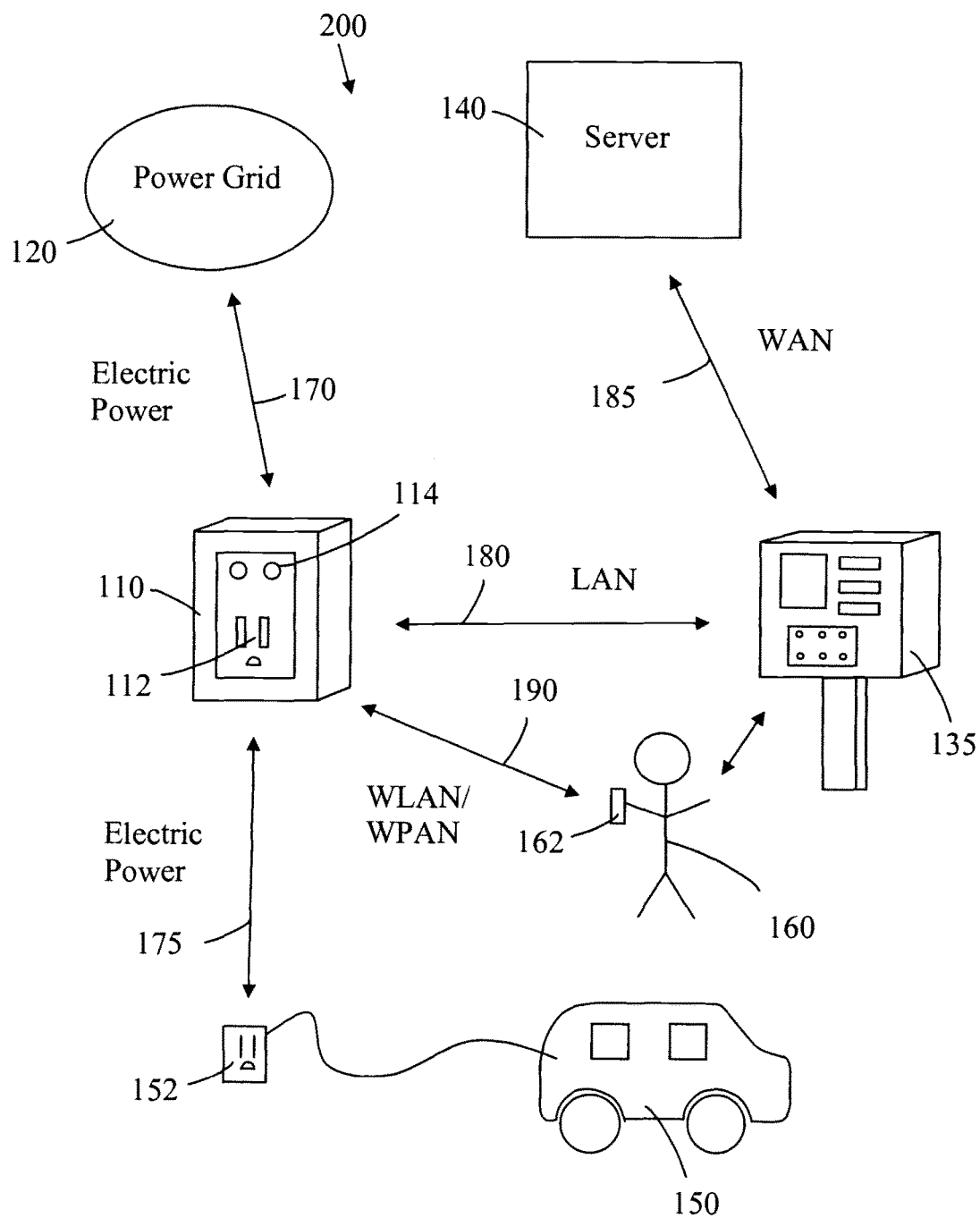
FIG. 2 is a schematic diagram of a network-connected charging outlet system according to a second embodiment of the invention.

A second embodiment of the network controlled charge transfer system 200 for charging electric vehicles 150 is shown in FIG. 2. The system 200 comprises a network-controlled charge transfer device (Smartlet™ 110, a local power grid 120, a payment station 135, and a server 140. The system 200 interfaces with an electric vehicle 150, with an electrical connector 152, and an electric vehicle operator 160, via a mobile communication device 162. The Smartlet™. 110 is connected to the local power grid 120 by an electric power line 170, and to the electric vehicle 150 by the electrical connector 152. The flow of electrical power may be in either direction for both of these electrical connections. The Smartlet™ 110 has a communication link to the payment station 135 over a LAN 180. The LAN 180 may be either a WLAN or a PLC network. The payment station 135 has a communication link to the server 140 over a WAN 185. (In this embodiment, the payment station 135 is taking the place of the data control unit 130 for acting as a bridge between the LAN and the WAN.) The electric vehicle operator 160 may use the mobile communication device 162 to establish a communication link to the Smartlet™ 110 over a wireless network 190. This wireless network may be a WLAN or a WPAN. Instead of using a mobile communication device 162, the electric vehicle operator 160 may manually interact with the payment station 135, which then sends appropriate instructions to the Smartlet™ 110 regarding charging of the electric vehicle 150. In preferred embodiments these instructions will include an instruction to unlock a cover over the electrical receptacle 112, thus allowing the vehicle operator 160 to connect the electric vehicle 150 to the electrical receptacle 112 with the electrical connector 152.

The payment station 135 can be several tens of meters remote from the Smartlet™ 110. The payment station 135 is shown comprising a currency reader, a credit card reader, a receipt printer, a display and input buttons. However, the payment station does not have to include all of these components. For example, some payment stations may not include a currency reader and will only allow payment by credit card using the credit card reader. The electric vehicle operator 160 can use the payment station 135 to pay for and schedule recharging of the electric vehicle 150, and also for V2G transactions. The payment station 135 may also be used to pay for parking. Further details of the payment station 135 are provided in FIG. 6 and the related description.

Figure 3:
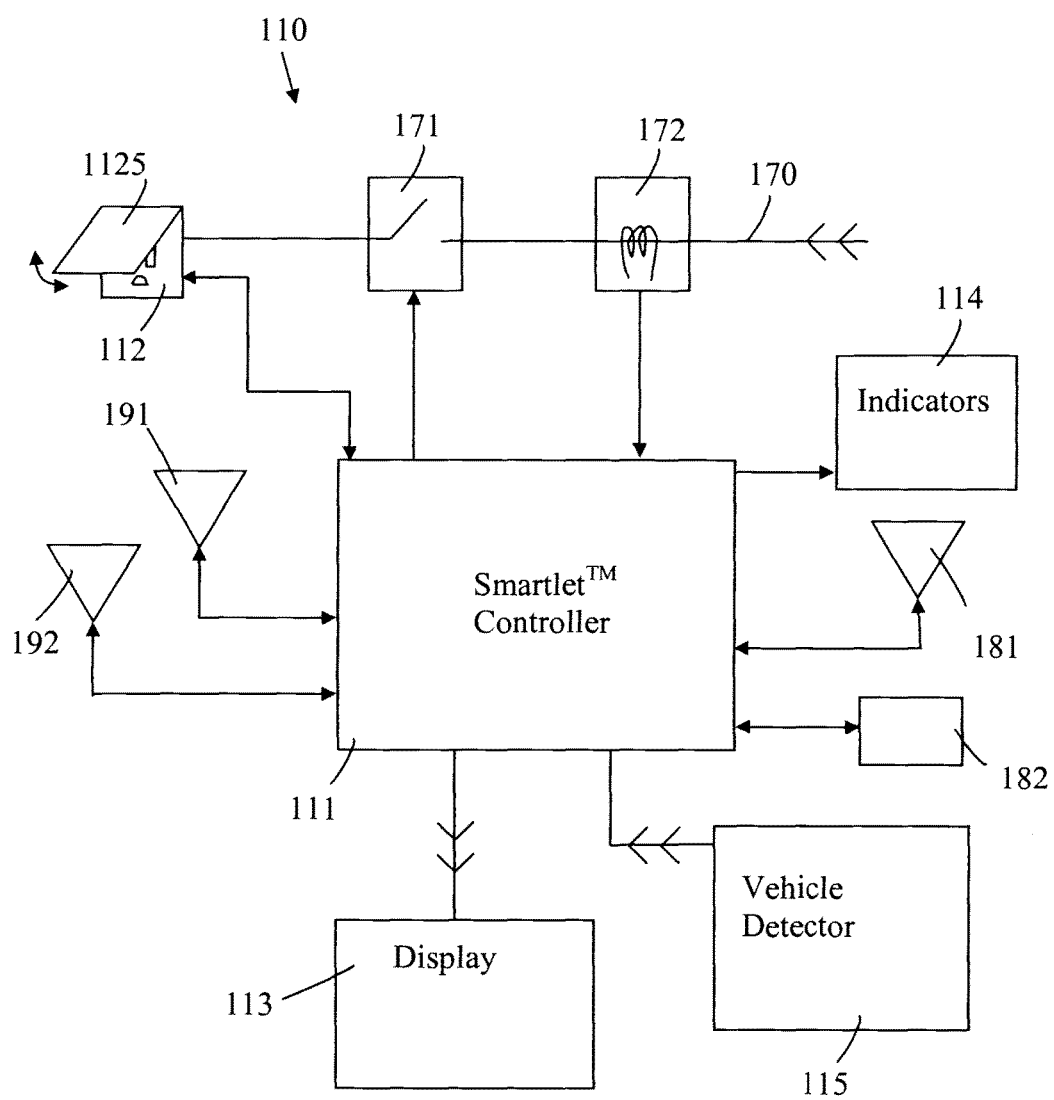
FIG. 3 is a schematic circuit diagram of a network-connected charging outlet of the invention.

A schematic of the Smartlet™ 110 is provided in FIG. 3. The Smartlet™ 110 comprises an electrical receptacle 112, a lockable cover 1125 over the electrical receptacle 112, a control device 171, a current measuring device 172, an electric power line 170, a controller 111, a display unit 113, a vehicle detector 115, a WLAN transceiver 181, an alternating current line transceiver 182, a WPAN transceiver 191 and an RFID transceiver 192.

Electric power is delivered to receptacle 112 along power line 170. Controller 111 is used to lock and unlock the cover 1125; the lock mechanism is electromechanical. When unlocked, the cover 1125 may be lifted by the vehicle operator 160 in order to connect the electric vehicle 150 to the electrical receptacle 112 using the electrical connector 152. Control device 171 is used to turn the electric supply at the receptacle 112 on and off. The control device 171 is preferably a solid state device and is controlled by controller 111. The current flowing along the power line 170 is measured by current measuring device 172. An example of a suitable measuring device 172 is an induction coil. The controller 111 is programmed to monitor the signal from the current measuring device 172 and to calculate the total power either: consumed (in recharging the electric vehicle); or transferred to the local power grid 120 from the electric vehicle 150 (V2G). It is also envisaged that power may be both consumed and transferred to the grid during the time an electric vehicle is connected to the Smartlet™ 110, in which case the controller 111 will calculate both the power consumed and the power transferred to the local power grid 120.

The indicators 114 and display 113 are controlled by the controller 111 and are used to provide information to the Smartlet™ 110 user. The indicators 114 are discussed in more detail above, with reference to FIG. 1, and the display 113 is discussed in more detail below with reference to FIG. 4.

Vehicle detector 115 is used to detect the presence of a vehicle in the parking space corresponding to the Smartlet™ 110. The vehicle detector 115 is controlled by the controller 111. The vehicle detector 115 is a detector such as a sonar sensor array, a camera, or an induction coil. The sonar array is an array as used on the rear bumper of automobiles to detect close proximity to an object; this array can be attached to the Smartlet™ 110 or will be mounted to a support structure in close proximity to the Smartlet™ 110. The camera is a digital camera providing a video signal to the Smartlet™ 110; the video signal is processed by an object recognition program to detect the presence of a vehicle or other obstruction. The induction coil is either embedded in the pavement of the parking space or is protected by a roadworthy casing attached to the surface of the pavement. The induction coil is connected to the Smartlet™ 110 and detects the presence of large metal objects in close proximity to the coil (such as an engine block, electric motor or rear differential of a vehicle).

The controller 111 is shown with four transceivers—a WLAN transceiver 181, an alternating current line transceiver 182, a WPAN transceiver 191 and an RFID transceiver 192. A transceiver is a device that both sends and receives signals, allowing for two-way communication. The WLAN transceiver 181 allows for the controller to communicate with mobile communication devices which are carried by a vehicle operator 160 (see communication link 190 in FIGS. 1 & 2) and with a data control unit 130 or payment station 135 (see communication link 180 in FIGS. 1 & 2). WLAN transceiver 181 could be a Wi-Fi® transceiver. The alternating current line transceiver allows the controller to communicate on a PLC network with a control data unit 130 or payment station 135 (see communication link 180 in FIGS. 1 & 2). The WPAN transceiver 191 allows the controller 111 to communicate with mobile communication devices 162 which are carried by the vehicle operator 160. WPAN transceiver 191 could be a BlueTooth® or ZigBee® transceiver. The RFID transceiver 192 allows the controller to communicate with a compatible RFID device carried by the vehicle operator 160. An example of an RFID device that could be carried by the vehicle operator 160 is a FasTrak® card. A FasTrak® device is an example of a two-way RFID communication device. Although, a one-way RFID communication device from vehicle operator 160 to controller 111 can be utilized. Not all embodiments of the Smartlet™ 110 have all four types of transceiver; however, all Smartlet™ 110 will have at least one wireless transceiver for communication with compatible mobile wireless communication devices 162 available to vehicle operators 160, and one transceiver for communication with the data control unit 130. See FIGS. 1 & 2.

Figure 4:
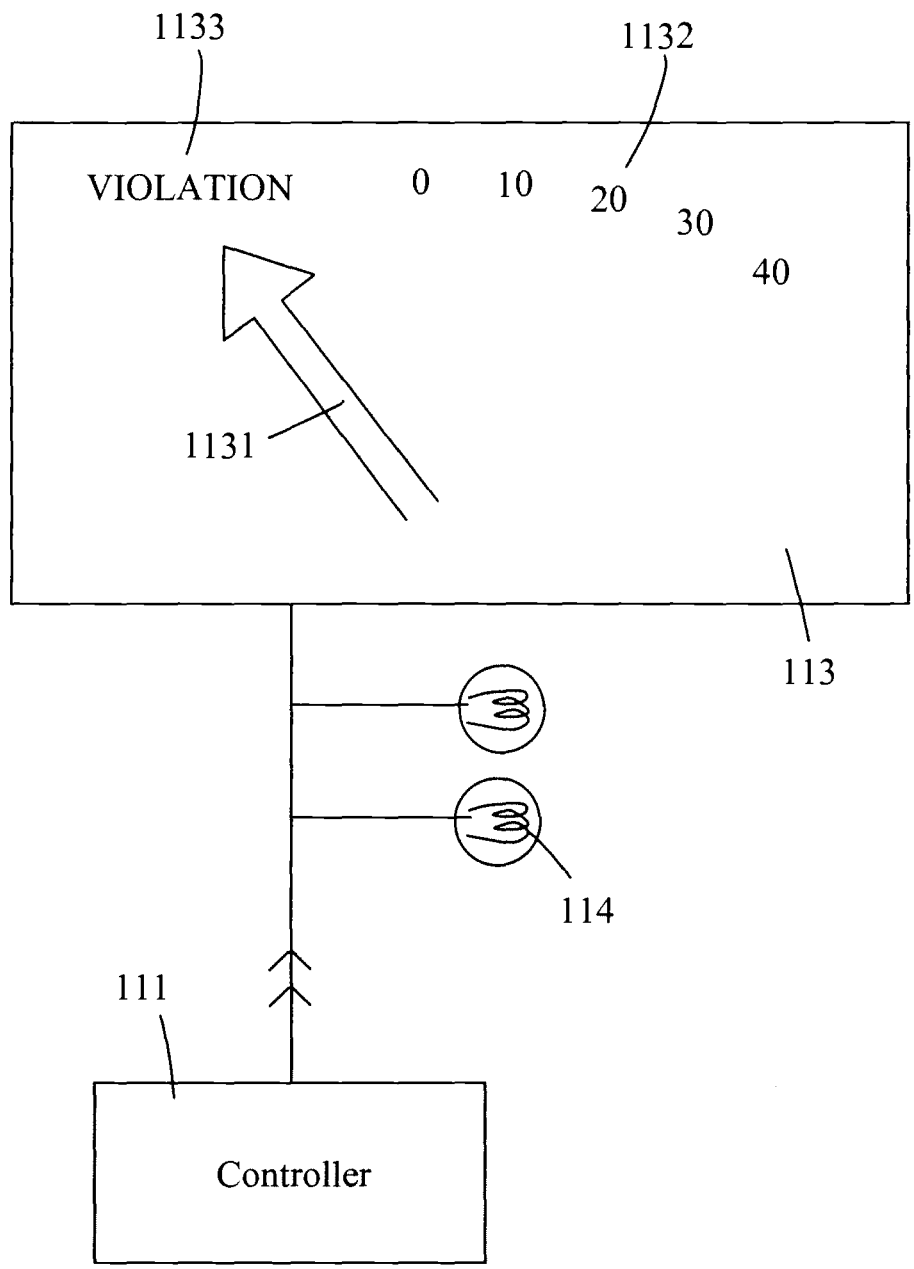
FIG. 4 is a schematic circuit diagram of a parking meter display unit of the invention.

A more detailed view of the display unit 113 is shown in FIG. 4. An example of parking information is shown on the display unit 113—an indicator 1131 shows the paid parking time remaining in minutes 1132 or a parking violation 1133. This parking information may be displayed in many other ways than that shown in FIG. 4. The display unit 113 may be an LCD (liquid crystal display); although other passive flat panel displays such as OLEDs (organic light emitting displays) and other emissive flat panel displays such as FEDs (field emission displays) may be used. When a passive display unit 113 is used it is preferred that it be backlit, so as to be readily viewed in low ambient light conditions. The display unit 113 is attached to the Smartlet™ 110 so that it is readily observable by the vehicle operator 160. For example, the display 113 may be mounted on a pole at a height of approximately 125 cm above the pavement, and the Smartlet™ 110 would also be mounted on the pole at a convenient height for the vehicle operator. The indicator lights 114 may be positioned next to the display 113, or may be positioned on the Smartlet™ 110 itself, as shown in FIGS. 1 & 2. The display 113 is controlled by the controller 111. The display 113 may also be used to display information regarding the vehicle charging process, such as: time charging, power consumed, estimated time to completion of charging, vehicle-to-grid (V2G) power transferred, general status indications and error warnings.

Figure 5:
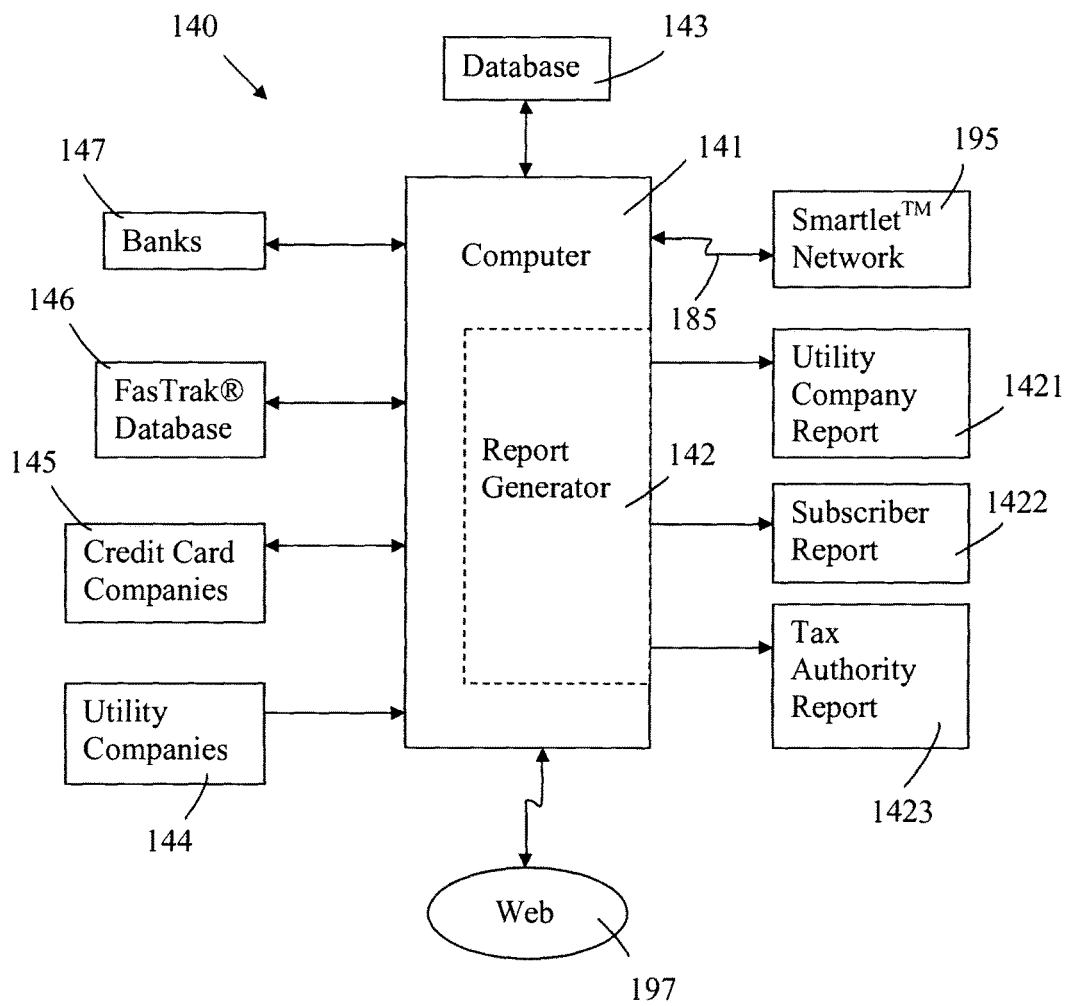
FIG. 5 is a schematic diagram of a server of the invention.

A schematic diagram of the server 140 is shown in FIG. 5. The server 140 comprises a computer 141, report generator 142, and database 143. The server 140 is configured to communicate with the following: Smartlet™ network 195; World Wide Web 197; utility companies 144, for receiving power load management data; credit card companies 145, for credit authorization and charging; FasTrak® database 146, for debiting FasTrak® accounts; and banks 146, for debiting bank accounts. The database 143 is used to store consumer profiles and other data required for report generation, as described below.

The report generator 142 creates reports such as: utility company reports 1421, detailing power consumed and V2G power sold to local power grid 120; subscriber reports 1422, detailing power consumed and V2G power sold to the local power grid 120, account balance, payments and invoices, and subscriber profile data; and tax authority reports 1423, providing details of taxable transactions.

The Smartlet™ network 195 comprises a multiplicity of data control units 130 and/or payment stations 135, each data control unit 130 and/or payment station 135 being connected by a communication link 180 to a multiplicity of Smartlets ™ 110. The communication link 185 between the computer 141 and the Smartlets™ network 195 is a WAN.

The server 140 is interfaced with the Web 197 to allow subscribers (owners and operators 160 of electric vehicles 150) to do the following: (1) set-up user/consumer profiles; and (2) determine availability of Smartlets™ 110 for recharging their electric vehicles 150. A user profile contains financial account information-details required for payment—and may also include information such as whether the vehicle operator wants to: charge the electric vehicle only during periods of lower power rates; not charge the vehicle during periods of high power grid load; and sell power to the local grid. The availability of Smartlets™ 110 is stored on the server and the information is collected from the Smartlet™ network 195. There are two ways that the availability of a Smartlet™ 110 can be determined: (1) using a vehicle detector 115 (see FIG. 3 and related description) to determine whether the parking space corresponding to the Smartlet™ 110 is available; and (2) flagging a Smartlet™ 110 as being unavailable whenever charging is ongoing, V2G is ongoing or parking has been paid for.

Figure 6:
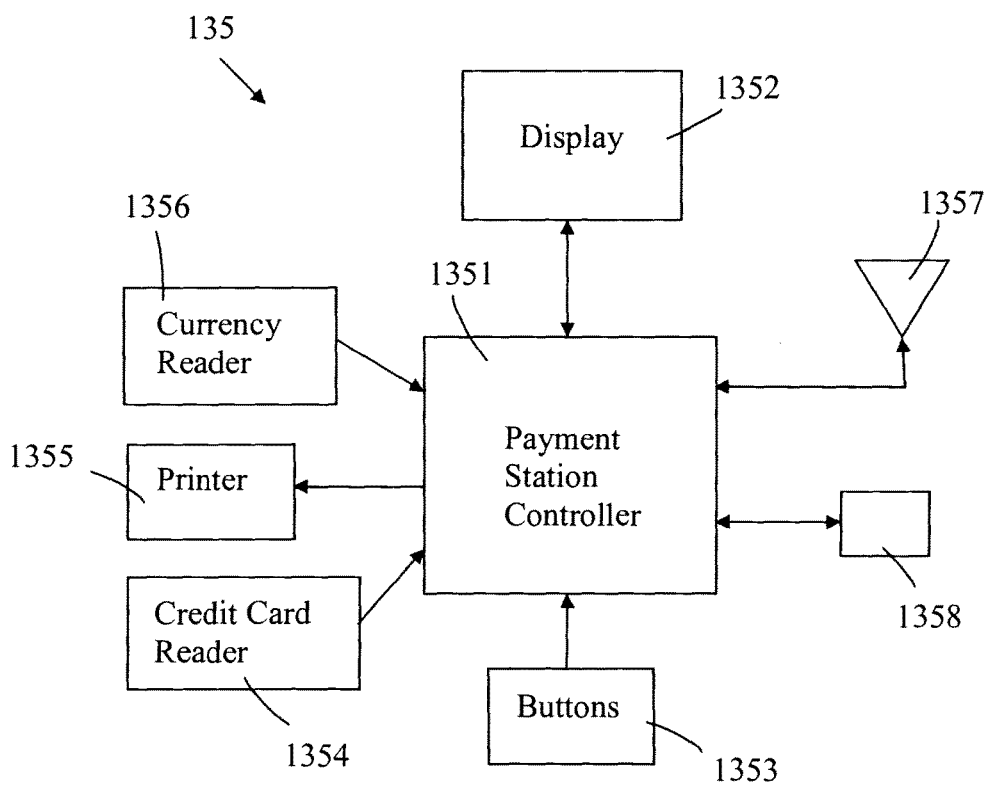
FIG. 6 is a schematic diagram of a remote payment system of the invention.

A schematic diagram of the payment station 135 is shown in FIG. 6. The payment station 135 comprises a controller 1351, a display 1352, a set of buttons 1352, a credit card reader 1354, a receipt printer 1355, a currency reader 1356, a wireless transceiver 1357 and an alternating current line transceiver 1358.

The display 1352 provides a vehicle operator 160 with information regarding recharging and/or parking their electric vehicle 150. The display shares the same characteristics as the display 113 discussed above with reference to FIG. 4. However, the display 1352 may also be touch sensitive, allowing a vehicle user to input information directly on the display screen 1352. The buttons 1353 allow for input of information requested from the display 1352.

The credit card reader 1354 is used for reading credit cards, debit cards, smart cards, and other cards that are used for identification purposes or for making payment. The printer 1355 is used for printing receipts, when requested by the consumer. The printer 1355 may also be used to print receipts for displaying in the electric vehicle 150 to show that recharging and/or parking is properly permitted. The currency reader 1356 is used for accepting currency—notes and/or coins—for payment. The currency reader 1356 is able to authenticate and identify the value of currency accepted.

The payment station 135 is networked to Smartlets™ 110 via either a WLAN or a PLC. The payment station controller 1351 takes the place of data control unit 130 in acting as a bridge between the LAN 180 and the WAN 185. See FIGS. 1 & 2.

A vehicle user 160 can use the network-controlled charge transfer systems 100 and 200 for charging their electric vehicle 150. A vehicle user 160 who has a user profile on the server 140 is referred to as a subscriber. Some examples of how the systems 100 and 200 can be used are provided below.

Vehicle Charging Utilizing a Mobile Wireless Communication Device 1. a subscriber uses the Internet to establish a profile, which includes setting-up payment by credit card, debiting a bank account, a FasTrak® account, a Paypal® account, or other financial service;
2. the subscriber uses a wireless mobile communication device 162, such as a mobile phone or a FasTrak® card, to request to the Smartlet™ 110 to charge the electric vehicle 150;
3. the subscriber connects the electric vehicle 150 to the Smartlet™ 110 using the connector 152 (see FIGS. 1 & 2);
4. the Smartlet™ 110 relays this request over the communication network to the server 140;
5. the server 140 accesses the subscriber profile from the database 143, validates the payment source by contacting the credit card company, FasTrak® database or bank, and via the communication network enables the Smartlet™ 110 to charge the vehicle 150;
6. based on the subscriber profile and load management data from the utility company the server determines the charging periods and communicates this information to the Smartlet™ 110;
7. the Smartlet™ 110 monitors the charging current, as described above with reference to FIG. 3;
8. when the vehicle 150 is disconnected from the Smartlet™ 110, charging is disabled and a bill is sent to the payment source. Note that determining when the electric vehicle 150 is disconnected from the Smartlet™ 110 can be done by: detecting when the current flow goes to zero; or using a sensor on the receptacle 112 which detects the mechanical removal of the connector 152. If a sensor is used, the sensor is monitored by controller 111. See FIG. 3.

Note that the load management data from the utility company may limit the ability to recharge the vehicle 150 or the recharge rate for vehicle 150, according to a Demand Response system. For example, the utility company could send a message to the Smartlet™ server 140 requiring a reduction in load. The Smartlet™ server 140 then turns off charging of some vehicles 150. Which vehicles have charging stopped will depend on the subscriber profiles and the requirements of the Demand Response system. The Demand Response system and subscriber profiles may also allow for V2G.

The general procedure described above is also followed for V2G or a combination of charging and V2G, except that V2G will result in credits to the subscriber's account for sale of power to the local power grid 120.

Vehicle Charging Utilizing a Payment Station
1. vehicle user 160 uses the payment station 135 to request and pay for charging the vehicle 150;
2. vehicle user 160 connects the electric vehicle 150 to the Smartlet™ 110 using connector 152;
3. the payment station 135 communicates via WAN 185 with server 140 for payment authorization;
4. the payment station 135 enables the Smartlet™ 110 for charging;
5. when the vehicle is disconnected from the Smartlet™ 110, charging is disabled, the payment station 135 is notified, the payment station 135 notifies the server 140 and a bill is sent to the payment source.

Note that the load management data from the utility company may limit the ability to recharge the vehicle 150 or the recharge rate for vehicle 150, according to a Demand Response system.

The general procedure described above is also followed for V2G or a combination of charging and V2G, except that V2G will result in credits to the vehicle user's account for sale of power to the local power grid 120.

Vehicle Parking Utilizing a Mobile Wireless Communication Device
1. a subscriber uses the Internet to establish a profile, which includes setting-up payment by credit card, debiting a bank account, a FasTrak® account, a Paypal® account, or other financial service;
2. the subscriber uses a wireless mobile communication device 162, such as a mobile phone, to request to the Smartlet™ 110 parking for the vehicle 150;
3. the Smartlet™ 110 relays this request over the communication network to the server 140;
4. the server 140 accesses the subscriber profile from the database 143, validates the payment source by contacting the credit card company, FasTrak® database or bank, and via the communication network sends a message to the Smartlet™ 110 to allow parking of the vehicle 150;
5. the Smartlet™ 110 sets the parking meter shown on display 113 (see FIGS. 3 & 4) and sets the indicators 114, if used;
6. the server 140 sends a bill to the payment source.

Optionally, if a vehicle detector 115 is used to detect the presence of a vehicle, then the amount of time a vehicle is parked without proper payment may be monitored and communicated to the payment station 135 and server 140.

Vehicle Parking Utilizing a Payment Station
1. vehicle user 160 uses the payment station 135 to request and pay for parking the vehicle 150;
2. the payment station 135 communicates via WAN 185 with server 140 for payment authorization;
3. the payment station 135 communicates to the Smartlet™ 110 to allow parking;
4. the server 140 sends a bill to the payment source.

The above methods for use of the Smartlet™ network for electric vehicle charging, V2G and parking can be combined. For example, a parking fee may be imposed in addition to a fee for power consumed in recharging a vehicle. Also, a parking fee may be imposed when a vehicle is parked for V2G.

The above embodiments of the present invention have been given as examples, illustrative of the principles of the present invention. Variations of the apparatus and method will be apparent to those skilled in the art upon reading the present disclosure. These variations are to be included in the spirit of the present invention. For example, the Smartlet™ network may be used for public and private garage and parking lot charging of electric vehicles. Furthermore, the Smartlet™ network may be used for home charging of electric vehicles, in which case a Smartlet™ receptacle in the home is connected via a LAN and a WAN to the Smartlet™ server 140. Those skilled in the art will appreciate that the Smartlet™ network may also be used for non-vehicle applications, including selling electricity to people in places such as airports and coffee shops.

What is claimed is:

1. A method in a server of a network-controlled charging system for electric vehicles, the method comprising:
    storing availability information of a plurality of network-controlled charge transfer devices;
    providing availability information of the plurality of network-controlled charge transfer devices to an electric vehicle operator, the availability information indicating for each of the plurality of network-controlled charge transfer devices whether that network-controlled charge transfer is unavailable due to that network-controlled charge transfer currently being used for charging;
    receiving a request for charge transfer for an electric vehicle at first one of the plurality of network-controlled charge transfer devices that is indicated as being available through the stored availability information, wherein the request for charge transfer originates from an electric vehicle operator;
    determining whether to enable charge transfer for the electric vehicle at the first one of the plurality of network-controlled charge transfer devices;
    responsive to determining to enable charge transfer, transmitting a communication to the first one of the plurality of network-controlled charge transfer devices that indicates to the first one of the plurality of network-controlled charge transfer devices to enable charge transfer; and
    generating a report detailing power consumed by charging electric vehicles at the plurality of network-controlled charge transfer devices.

2. The method of claim 1, wherein determining whether to enable charge transfer includes validating a payment source for the charge transfer.

3. The method of claim 1, further comprising:
    receiving an indication of a load reduction requirement; and
    transmitting a communication to the plurality of network-controlled charge transfer devices that indicates to the plurality of network-controlled charge transfer devices to limit charge transfer.

4. The method of claim 1, further comprising:
    receiving a message that indicates a period of high electricity demand;
    determining that the electric vehicle operator does not want to charge the electric vehicle during periods of high electricity demand; and
    transmitting a communication to the first one of the plurality of network-controlled charge transfer devices that indicates to the first one of the plurality of network-controlled charge transfer devices to stop charge transfer.

5. The method of claim 1, further comprising:
receiving a message that indicates a period of high electricity demand;
determining that the electric vehicle operator is willing to sell energy stored in the electric vehicle to a local power grid coupled with the first one of the plurality of network-controlled charge transfer devices; and
communicating to the first one of the plurality of network-controlled charge transfer devices to enable charge transfer from the electric vehicle to the local power grid.

6. The method of claim 1, wherein determining whether to enable charge transfer includes performing the following:
accessing a profile associated with the electric vehicle operator, wherein the profile indicates whether that electric vehicle operator wants to charge their electric vehicle only during periods of lower power rates; and
responsive to determining a period of lower power rates exist, determining to enable charge transfer.

7. The method of claim 1, further comprising:
transmitting information to the first one of the plurality of network-controlled charge transfer devices that indicates whether the electric vehicle operator wants to charge their electric vehicle only during periods of lower power rates to enable the first one of the plurality of network-controlled charge transfer devices to manage charge transfer based on that information.

8. The method of claim 1, wherein determining whether to enable charge transfer includes performing the following:
accessing a profile associated with the electric vehicle operator; and
validating a payment source for the electric vehicle operator based on the profile.

9. The method of claim 8, further comprising:
responsive to completion of charge transfer, requesting payment from the payment source.

10. A server in a network-controlled charging system for electric vehicles, comprising:
a computer configured to perform the following:
store availability information of a plurality of network-controlled charge transfer devices;
provide availability information of the plurality of network-controlled charge transfer devices to an electric vehicle operator, the availability information indicating for each of the plurality of network-controlled charge transfer devices whether that network-controlled charge transfer is unavailable due to that network-controlled charge transfer currently being used for charging;
receive a request for charge transfer for an electric vehicle at first one of the plurality of network-controlled charge transfer devices that is indicated as being available through the stored availability information, wherein the request for charge transfer originates from an electric vehicle operator,
determine whether to enable charge transfer for the electric vehicle at the first one of the plurality of network-controlled charge transfer devices,
responsive to a determination to enable charge transfer, transmit a communication to the network-controlled charge transfer that indicates to the first one of the plurality of network-controlled charge transfer devices that indicates to the first one of the plurality of network-controlled charge transfer devices to enable charge transfer, and
generate a report detailing power consumed by charging electric vehicles at the plurality of network-controlled charge transfer devices.

11. The server of claim 10, wherein the computer is configured to determine whether to enable charge transfer through a validation of a payment source for the charge transfer.

12. The server of claim 10, wherein the computer is further configured to perform the following:
receive an indication of a load reduction requirement; and
transmit a communication to the plurality of network-controlled charge transfer devices that indicates to the plurality of network-controlled charge transfer devices to limit charge transfer.

13. The server of claim 10, wherein the computer is further configured to perform the following:
receive a message that indicates a period of high electricity demand;
determine that the electric vehicle operator does not want to charge the electric vehicle during periods of high electricity demand; and
transmit a communication to the first one of the plurality of network-controlled charge transfer devices that indicates to the first one of the plurality of network-controlled charge transfer devices to stop charge transfer.

14. The server of claim 10, wherein the computer is further configured to perform the following:
receive a message that indicates a period of high electricity demand;
determine that the electric vehicle operator is willing to sell energy stored in the electric vehicle to a local power grid coupled with first one of the plurality of network-controlled charge transfer devices; and
communicate to the first one of the plurality of network-controlled charge transfer devices to enable charge transfer from the electric vehicle to the local power grid.

15. The server of claim 10, wherein the computer is configured to determine whether to enable charge transfer includes the computer to perform the following:
access a profile associated with the electric vehicle operator, wherein the profile indicates whether that electric vehicle operator wants to charge their electric vehicle only during periods of lower power rates; and
responsive to a determination that a period of lower power rates exists, determine to enable charge transfer.

16. The server of claim 10, wherein the computer is further configured to transmit information to the first one of the plurality of network-controlled charge transfer devices that indicates whether the electric vehicle operator wants to charge their electric vehicle only during periods of lower power rates to enable the first one of the plurality of network-controlled charge transfer devices to manage charge transfer based on that information.

17. The server of claim 10, wherein the computer is configured to determine whether to enable charge transfer includes the computer to perform the following:
access a profile associated with the electric vehicle operator; and
validate a payment source for the electric vehicle operator based on the profile.

18. The server of clam 17, wherein the computer is further configured to perform the following:

responsive to completion of charge transfer, request payment from the payment source.

\* \* \* \* \*